US009051993B2

(12) United States Patent
Benecke

(10) Patent No.: US 9,051,993 B2
(45) Date of Patent: Jun. 9, 2015

(54) CHAIN LINK AND CHAIN MADE THEREWITH

(71) Applicant: J. D. Theile GmbH & Co. KG, Schwerte (DE)

(72) Inventor: Rainer Benecke, Dortmund (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 0 days.

(21) Appl. No.: 14/329,914

(22) Filed: Jul. 12, 2014

(65) Prior Publication Data
US 2015/0020496 A1    Jan. 22, 2015

(30) Foreign Application Priority Data

Jul. 17, 2013   (DE) .................... 20 2013 103 211 U

(51) Int. Cl.
  *F16G 15/12*   (2006.01)
  *B65G 19/20*   (2006.01)
  *F16G 13/12*   (2006.01)

(52) U.S. Cl.
  CPC ............... *F16G 15/12* (2013.01); *B65G 19/20* (2013.01); *F16G 13/12* (2013.01)

(58) Field of Classification Search
  CPC .......... F16G 13/12; F16G 15/12; B65G 19/20
  USPC .................... 59/3, 78, 84, 85, 86, 90, 93
  See application file for complete search history.

(56) References Cited

U.S. PATENT DOCUMENTS

| | | | | |
|---|---|---|---|---|
| 4,042,001 A | * | 8/1977 | Muller | 59/86 |
| 4,094,141 A | * | 6/1978 | Rehbein | 59/93 |
| 4,110,971 A | * | 9/1978 | Bruce | 59/84 |
| 4,241,575 A | * | 12/1980 | St. Germain | 59/93 |
| 5,419,379 A | * | 5/1995 | Schmidt | 59/78 |
| 6,679,648 B2 | | 1/2004 | Benecke | |
| 7,065,952 B2 | * | 6/2006 | Benecke | 59/3 |
| 7,231,759 B2 | | 6/2007 | Benecke | |
| 7,930,974 B2 | * | 4/2011 | Nakatani et al. | 101/126 |
| 7,971,422 B2 | * | 7/2011 | Shnayder et al. | 59/95 |
| 8,234,852 B2 | * | 8/2012 | Pengg et al. | 59/78 |

* cited by examiner

*Primary Examiner* — David B Jones
(74) *Attorney, Agent, or Firm* — Margaret Polson; Polson Intellectual Property Law, PC

(57) ABSTRACT

A chain link 2 for connecting two additional chain links 3, 3.1 hooked therein, for the formation of a round steel link chain, for example, a conveyor chain of a scraper conveyor, comprises two bends 4, 5 and two legs 7, 7.1 connecting the bends. On its external side facing away from its inner space 6, one or more functional surfaces 8, 11, 15, 15.1, 16 are present. The chain link 2 is designed asymmetrically with respect to at least one of its central planes in at least one of its two bends 4, 5 so as to form or enlarge one or more functional surfaces 8, 11, 15, 15.1, 16.

17 Claims, 4 Drawing Sheets

CHAIN LINK AND CHAIN MADE THEREWITH

CROSS REFERENCE APPLICATIONS

This application claims the benefit of German Application No. 20 2013 13 211.5 filed Jul. 17, 2013, which is incorporated herein by reference for all purposes.

BACKGROUND

Chain links can be as horizontal chain links in the case of oriented built-in chains. For example, such horizontal chain links are used as component of steel link chains as conveyor chains for operating scraper conveyors in underground coal mining. These chains are of the round steel link type. Round steel link chains are characterized by an eyelet-shaped design of the individual chain links. Scraper conveyors or chain scraper conveyors usually include two circulating motor-driven conveyor chains to which scrapers are secured. These scrapers extend between the chains and connect the chains to one another. In a corresponding application, the conveyor chains also include as center chain, in particular, as double center chain, in the case of a chain scraper conveyor. During operation, the scraper conveyor chains are pulled through a conveyor groove, as a result of which the overburden, for example, coal, carried by the scraper is conveyed to a loading station. The conveyor chains with the scrapers are then led back in another run.

Horizontal chain links for conveyor chains can have functional regions on their outward facing sides, away from the inner space of the chain link. These functional regions can be regions that structure the external side of the leg to allow a scraper to be connected thereto. Functional regions can also be incorporated in the bending regions of such horizontal chain links. DE 41 24 788 A1 discloses a horizontal chain link with functional surface in the bend region. The functional surfaces on this previously known horizontal chain link have flat contact surfaces on the facing external sides with respect to the central longitudinal plane of the chain link in the bend area. The external side pointing in the longitudinal direction of the chain link is implemented in the shape of an arrow in cross section through two prow surfaces which converge toward one another at an angle. The steel link chain produced using such horizontal chain links is therefore also referred to as arrowhead chain. The tip of the horizontal chain link formed by the prow surfaces runs straight in a top view of the horizontal chain link. The prow surfaces themselves have a concave shape so that they can be brought into flat contact with a tooth of a chain wheel, which has a convex shape with the same curvature radius on its thrust flank. This steel link chain is characterized by a contact surface which is to be brought in contact with the thrust flank of the tooth of a chain wheel and thus by a more advantageous power transfer from the chain wheel to the chain in comparison to previous horizontal chain links.

In order for the straight sections to be long enough to have a sufficient contact surface on the tooth of a chain wheel, the bend sections adjoining the leg are hump-like over the interval between the external sides of the legs. Therefore, they protrude over the outer width of the chain link in the area of its leg. In this previously known horizontal chain link, the length of the contact surfaces which contacts the thrust flank of a tooth of a chain wheel in the direction of the outer width of the horizontal chain link is increased. However, in order to make use of a larger contact surface, it is also necessary to design the teeth of the chain wheel so that they are correspondingly broader. Disadvantageously, moreover, this previously known conveyor chain with the described horizontal chain links tends to kink when the chain is loose.

To improve the steel link chain disclosed in DE 41 24 788 A1 to prevent the above outlined problems, DE 10 2010 061 269 A1 had the horizontal chain link have the same or substantially same height and the same or substantially the same width which defines the nominal diameter of the horizontal chain link as it circulates. Additionally, the at least one functional region is set back toward the interior relative to a virtual external surface enveloping the height and the width of the horizontal chain link. Thus, in this horizontal chain link, the functional regions are set back relative to the external side of the envelope and they impede the hinging with the vertical chain links hooked in the horizontal chain link. Due to this arrangement, said vertical chain links therefore can hinge without impediment, particularly in the bends, which helps prevent kinking.

Although, in the case of the conveyor chain disclosed in DE 10 2010 061 269 A1, wear is reduced in comparison to previously known conveyor chains without preventing the hinge-ability of the chain links hooked in one another, it would be desirable to be able to increase the useful life of such a conveyor chain built into a scraper conveyor.

The aim of the present disclosure is to propose a chain link which can form a horizontal chain link for a conveyor chain which, when used a conveyor chain, has an extended useful life relative to previously known conveyor chains, when built into a scraper conveyor.

The foregoing example of the related art and limitations related therewith are intended to be illustrative and not exclusive. Other limitations of the related art will become apparent to those of skill in the art upon a reading of the specification and a study of the drawings.

SUMMARY

This aim is achieved by a chain link which, in regard to at least one of its central planes, is designed asymmetrically in at least one of its two bends, for the formation or enlargement of one or more functional surfaces.

The present disclosure relates to a chain link for connecting two additional chain links hooked therein, for the formation of a round steel link chain, such as a conveyor chain of a scraper conveyor. The chain link comprises two bends and two legs connecting the bends, and which has one or more functional surfaces on its external side facing away from its inner space. Furthermore, the disclosure relates to a steel link chain with individual chain links hooked in and consisting of an alternation of horizontal chain links and of vertical chain links.

In the present chain link, at least one of its two bends is designed asymmetrically relative to the x-y central plane and/or the y-z central plane. It is understood in this design that the two bends of the chain link can be formed so that they are not identical. When this chain link is used as a horizontal chain link of a conveyor chain, this means that the bend pointing in the conveyance direction can have a shaping that is different from the bend pointing in the opposite direction from the conveyance direction. The asymmetry in the design of at least one bend is used to form or enlarge one or more functional surfaces on the outward facing side of the bend. Typically, the inward facing external surface of the bend is not influenced by the asymmetry. When using such an asymmetric design of the bends, one sometimes intentionally also accepts a restriction with regard to the mobility of a chain link hinging on this bend. Here, the asymmetry is designed such that, as a result of said asymmetry, the freedom of movement of the chain link hinging on the bend is limited in at least one direction. A kinking between chain links hooked into one another is prevented as a result of such a restriction on the hingeability. Kinking can sometimes result from only partially restricting the hingeability of chain links hooked into one another. To achieve this, in a preferred embodiment, it is provided that the asymmetry is achieved by a corresponding enlargement of the cross-sectional surface in comparison to the cross-sectional surface of a standard round steel link of the same diameter. Based on the asymmetry, it is understood that the cross-sectional enlargement relative to the central plane in question, for example, the x-y central plane, is different for the two sides of same central plane. It is also possible to leave one side of the central plane used for the asymmetry unchanged in comparison to the design of previously known chain links, and to shape only the other side differently using more material.

In the context of these embodiments, reference is made to axes and planes of the chain link. The axes are defined as follows: x: direction of the length of the chain link, y: direction of the width of the chain link, z: direction orthogonally to the x-y plane defined by the axes x, y. In the context of these embodiments, reference is made to central planes, for example, the x-y central plane. This plane is the plane defined by the two axes, for example, the x and y axes, which, in the case of the x-y central plane, is located in the center of the chain link in its z extension. These axes are shown in FIGS. 1 and 2.

A special application field for the use of asymmetric chain links of the present disclosure is their use as horizontal chain link in a conveyor chain for mining applications, in particular, for use in a conveyor chain in a scraper conveyor.

The consequence of an asymmetric design of the bend(s) present in the prior art horizontal chain links of conveyor chains is that the thrust surfaces that allow the tooth surface of a tooth of a chain wheel to engage the chain to drive it are formed as continuous thrust surface extending over the x-y central plane on each side of the vertical chain link hinging on this bend. To that extent, the full material thickness of the bend can be used to form a single thrust surface in such a design. This results in a larger contact surface on the tooth of a chain wheel. On the other side, in the case of an asymmetric design, it is possible for the first time to provide functional surfaces which were unknown in the prior art chain links. In the case of a horizontal chain link of the present disclosure, the bend pointing in the conveyance direction can have at least one guide surface extending over the x-y central plane. The guide surface makes it possible to provide the bend pointing in the conveyance direction with guiding properties (guide properties). With an appropriately inclined guide surface it is possible to counteract floating or a tendency to float of such a horizontal chain link in the conveyed material. Such an inclined guide surface typically extends over at least 50% of the height of the horizontal chain link, preferably even over more than 70%. In order to prevent floating, the guide surface is inclined in the direction toward the lower side of the horizontal chain link. The lower side of the horizontal chain link forms the side of the horizontal chain link by which said link dips into a pocket of a chain wheel. As a result of the provision of such an inclined guide surface, the lower side of the bend is enlarged at the same time. The inclination of inclined guide surface is preferably adapted to the material to be conveyed and to the conveyance rate provided. This surface, which forms an acute angle with the guide surface, preferably has a flat design. The purpose of this is to increase the contact surface of the lower side of this bend with the complementary surface of a pocket of a chain wheel. The greater the contact surface is, the smaller the surface pressure and wear are. Thus, it has been found that, using one and the same arrangement, two different arrangements have been made available, which reduce wear and thus increase the useful life.

Previously known conveyor chains have been developed on the condition that the chain links and thus also the horizontal chain links in the three central planes are designed symmetrically. To the extent known, this disclosure is the first time that it is proposed to design chain links in general, and in particular horizontal chain links for conveyor chains in the context of mining applications, asymmetrically in the described manner, and to knowingly accept, if needed, a limitation of the flexibility compared to the vertical chain link hinging in the conveyance direction on the horizontal chain link, and to the vertical chain link hinging in the direction opposite from the conveyance direction. The limitation of the freedom of movement of the chain links hooked in such a chain link is provided in different directions with regard to these two hooked chain links. This occurs when, in the relevant directions of pivotability, a hinged connection of at least one of these directions is not influenced by the asymmetric design of the chain link. Thus, in a design of the chain link as a horizontal chain link for a conveyor chain the flexibility of the vertical chain element hinging on this bend around the y axis is impaired in comparison to a hingeability of a standard round steel link chain when there is a guide surface on the bend pointing in the conveyance direction. However, the pivotability of the vertical chain link compared to the horizontal chain link around the z axis is not limited. In such a design, the hingeability of the vertical chain link hinging around the y axis on the bend pointing in the direction opposite from the conveyance direction is unimpeded. However, the hingeability of the vertical chain link around the z axis of the horizontal chain link can be impeded. In the case of such impeded hingeability, the impediment can be such that hingeability in only one direction on a plane is provided, or also in the two directions based on an aligned arrangement of chain links hooked in one another. An impediment to movement in only one direction is possible in the case of the provision of a guide surface on the bend facing in the conveyance direction and the resulting lengthened lower side of the chain link. In such a design, the vertical chain link hinged on this bend will have minimal or no hingeability in contrast to the hingeability necessary for it to be able to be guided around a chain wheel. In the case of an impediment to the hingeability in the two directions around an axis, it is possible to provide thrust surface prolongations on the bend facing in the direction opposite from the conveyance direction, and the other vertical chain link hinges between them. On the other hand, the vertical chain link hinging on the bend supporting the guide surface can hinge without impediment around the z axis.

The thrust surface prolongations bear in each case a thrust surface, as termination pointing in the conveyance direction. In order to enlarge the thrust surfaces on such thrust surface prolongations, the latter can have a greater height than the rest of the components of the horizontal chain link. It should be understood that as a result the hingeability of the vertical chain link hinging on this bend around the z axis is possibly only a few angular degrees, in particular to the extent of the play that is provided. On the other side, this vertical chain link can hinge without impediment around the central bend section located between the thrust surface projections, around the y axis. For the operation of a conveyor chain in the context of a scraper conveyor, it is entirely sufficient if only every other hinge can hinge without impediment around the z axis.

It is also considered to be sufficient if only every other hinge can hinge without impediment in the direction toward the outside around the y axis.

As a result of the deviation from the predominant teaching, the design of a chain link, in particular also a chain link for a conveyor chain, symmetrically with respect to its x-y central plane, it is possible, in the case of the conveyor chain with horizontal chain links of the described type, to more than double the useful life in the installed state in a scraper conveyor. This is also made possible by the increase in the wear of the underlying surfaces. In the case of conventional horizontal chain links, which are designed symmetrically with respect to the x-y central plane, thrust surfaces are provided on the two sides of the x-y central plane. These thrust surfaces are naturally correspondingly smaller and therefore they are subjected to greater wear. When the thrust surfaces were worn off on one side of the x-y central plane, then the conveyor chain was flipped over 180° relative to its longitudinal axis so as to also have wear of the thrust surfaces located on the other side of the x-y central plane. For this purpose, it is necessary to remove the conveyor chain from the scraper conveyor, to transport it above ground, to detach the scrapers, flip over said scrapers and the conveyor chain, reinstall them, and incorporate them again underground. Depending on the length of such a conveyor chain, such a procedure can take several weeks. With a conveyor chain using the claimed horizontal chain links, there is no intention of carrying out such a flipping of the chain, which typically is not even possible at all. Therefore, the described procedure of flipping such a chain or several conveyor chains used on a scraper conveyor is avoided, if the conveyor chains are provided with horizontal chain links of the claimed type.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
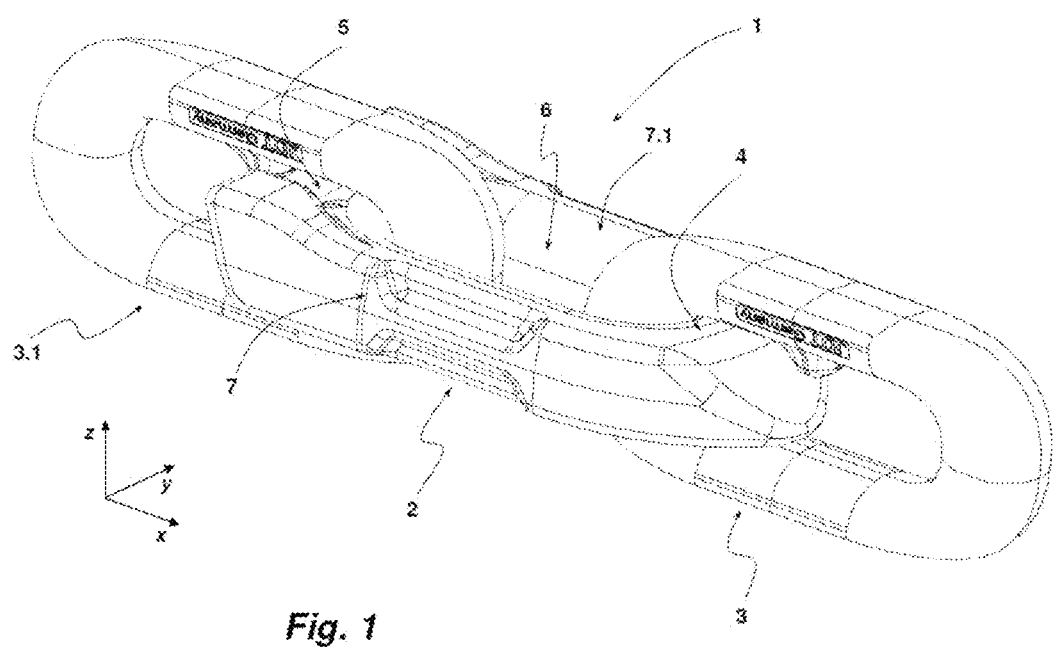
FIG. 1 is a perspective view of a chain strand section formed from a horizontal chain link and two vertical chain links hooked therein.

A conveyor chain for use in a scraper conveyor is a round steel link chain formed by an alternating sequence of horizontal chain links and vertical chain links. One or more chain locks can be incorporated in the chain. FIG. 1 shows a chain strand 1 as short section of such a conveyor chain, formed by a horizontal chain link 2 and two vertical chain links 3, 3.1 hooked therein. The vertical chain links 3, 3.1 are those known from DE 10 2010 061 263 A1. For a more detailed description of the vertical chain links 3, 3.1, reference is therefore made to the disclosures from DE 10 2010 061 263 A1, which is incorporated herein by reference in its entirety.

The horizontal chain link 2 has, like a conventional horizontal chain link, a bend 4 facing in the conveyance direction, a bend 5 facing on a direction opposite from the conveyance direction, and two legs 7, 7.1 which, with the bends 4, 5, enclose the inner space 6 of the horizontal chain link 2 and connect the bends 4, 5 to one another. The legs 7, 7.1 bear scraper connection pockets on their side facing outward and thus away from the inner space 6. A scraper can be connected to these pockets in a known manner.

Figure 2:
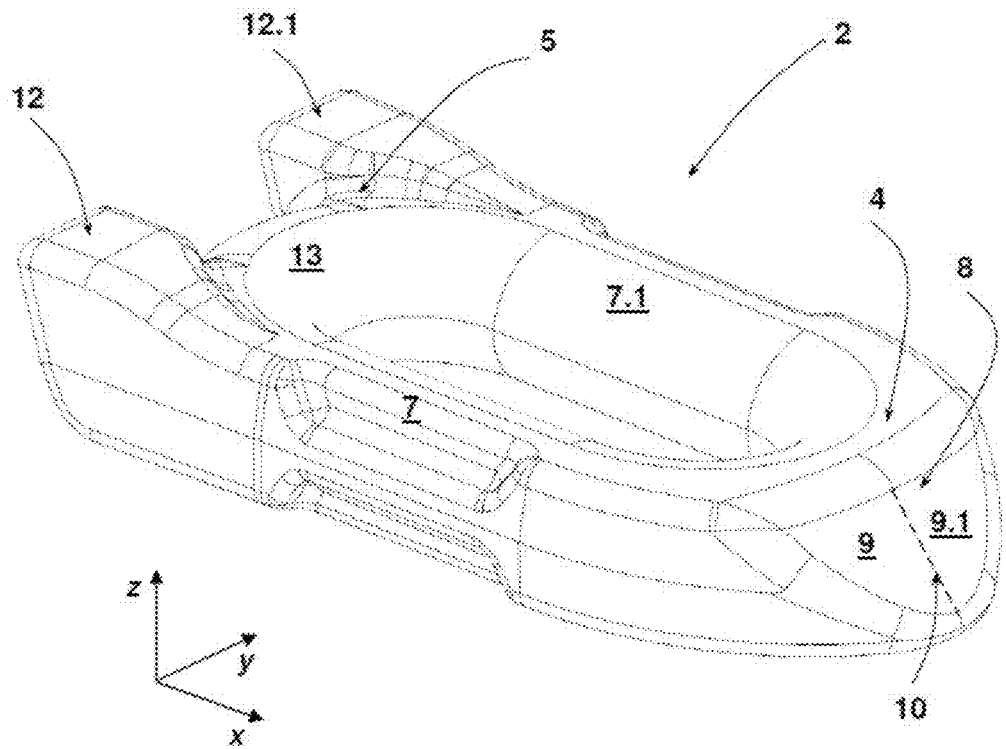
FIG. 2 is an enlarged perspective view of the horizontal chain link of FIG. 1.

The circumferential design of the horizontal chain link 2 can be seen in the individual representation of this chain link in FIG. 2. As can be seen clearly, the horizontal chain link 2 is asymmetric with respect to its x-y central plane. In the depicted embodiment, this asymmetry is limited to the design of the bends 4, 5. FIG. 2 clearly shows that the surface of the horizontal chain link 2 facing toward the inner space 6 is not affected by this asymmetry. In the represented embodiment example, the 180° section facing toward the inner space 6 is designed in each case so that it is rounded like a conventional horizontal chain link. Thus, the asymmetry relates only to the external sides of the bends 4, 5, therefore over the outward facing 180° section. The bends 4, 5 extend overall in the x-y central plane over 180°.

Figure 3:
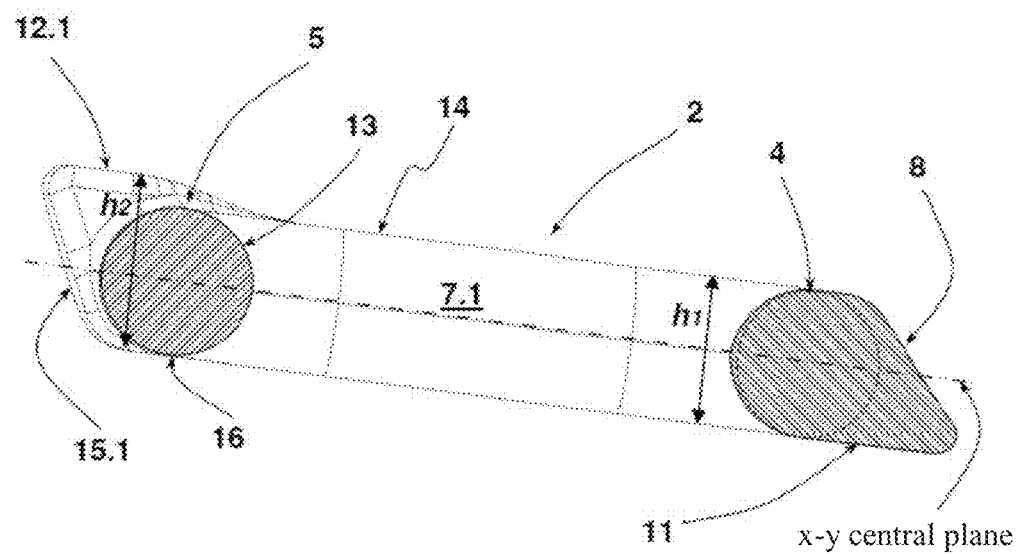
FIG. 3 is a cross-sectional view through the x-z central plane of the horizontal chain link of FIG. 2.

The bend 4 is asymmetric relative to the x-y central plane, as a result of the formation of a guide surface 8 extending over the x-y central plane asymmetrically. The guide surface 8 can be formed by two partial surfaces 9, 9.1. The partial surfaces 9, 9.1 are then slightly tilted relative to the y axis, so that an edge 10 is formed between the two partial surfaces 9, 9.1, and the partial surfaces 9, 9.1 thus are tilted by a certain amount relative to the two legs 7, 7.1. However, the guide surface 8 can also be continuous, so that, in principle, the partial surfaces 9, 9.1 are mutually in alignment in the direction of the y axis. In the represented embodiment example, the guide surface 8 extends over approximately 75% of the height $h_1$ of the horizontal chain link 2, which can be better seen in the side view of FIG. 3. The height $h_1$ drawn in FIG. 3 is the height of the horizontal chain link 2 in the area of the bend 4. The guide surface 8 or the partial surfaces 9, 9.1 transition with a radius into the upper side shown in the figures. The same also applies to the transition to the lower side 11 of the bend 4. In a conveyor chain, all the horizontal chain links 2 are built in so that they have the same orientation, in particular so that the guide surface 8 faces outward with respect to the orientation of the endless chain. This means that the lower side 11 of the bend 4 of the horizontal chain link 2 faces toward the bottom of the conveyor groove. The effect of the guide surface 8 is that the horizontal chain links 2 pulled through the conveyed material are pushed in the direction toward the conveyor groove bottom. In this manner, undesired floating, which can be observed occasionally in conventional horizontal chain links, is effectively prevented. The design of the edge 10 extending in the x-z central plane at the same time also produces a certain degree of centering. Due to the above-described arrangements, it is possible at the same time to pull the horizontal chain link 2 with less force through the material to be conveyed.

In FIG. 3, the cross-sectional surface of a conventional horizontal chain element having the same nominal diameter is drawn with a broken line in the bend 4. The comparison of the cross-sectional geometry of the bend 4 of the horizontal chain link 2 with that of a conventional horizontal chain link clearly shows that considerably more material is present on the external side of the bend facing away from the inner space 6 for the formation of the asymmetry in the x-y central plane. The design of the guide surface 8 being tilted toward the lower side 11 has the effect that the lower side 11 of the bend 4 is considerably elongated. The lower side 11 is designed to be flat and it is used as a contact surface by means of which the bend 4 rests on the bottom of a chain link recess of a chain wheel. Thus, as a result of the provision of the guide surface 8, not only is the latter guide surface provided, but, in addition, the contact surface in a chain link recess of a chain wheel is increased in order to minimize wear at this site.

Figure 4:
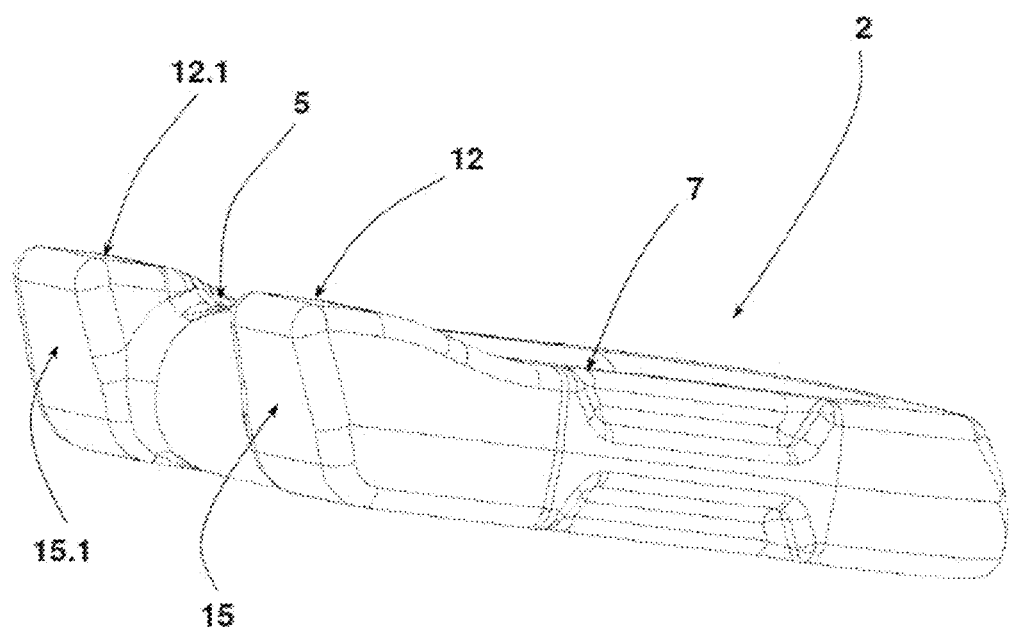
FIG. 4 is an additional perspective view of the horizontal chain link.

The bend 5 is also designed so that it is asymmetric relative to the x-y central plane in the represented embodiment example. The asymmetric design can be seen particularly well in the cross-sectional representation of FIG. 3. The bend 5 bears two thrust surface prolongations 12, 12.1, which are formed on the outer external surface of the bend 5 and which extend, like an elongation of the legs 7, 7.1, counter to the direction of conveyance and past the termination of the bend 5 facing in the direction opposite from the conveyance direction. The two thrust surface prolongations 12, 12.1 are at a distance from one another and they enclose a central bend section 13 in the y directions. As can be seen in the cross-sectional representation of FIG. 3, the central bend section 13 is implemented with a circular cross-sectional area. On this central bend section 13, the vertical chain link 3.1 hinges, and it can hinge thereon without impediment around the y axis in the two directions. In the represented embodiment example, the thrust surface prolongations 12, 12.1 also extend above the upper termination, as can be seen based on the upper side 14 of the legs 7, 7.1, of the horizontal chain link 2 and thus they have a greater height $h_2$ than the height $h_1$ in the remaining areas of the horizontal chain link 2. The greater height $h_2$ of the thrust surface prolongations 12, 12.1 is used for enlarging the rearward termination of the thrust surface prolongations 12, 12.1 each of which bears a thrust surface 15, 15.1 (see also FIG. 4). The thrust surfaces 15, 15.1 are used as engagement surface for the horizontal chain link 2, with which the tooth flank of a tooth of a chain wheel engages so as to drive a conveyor chain produced with horizontal chain links 2. The thrust surfaces 15, 15.1 are tilted relative to the vertical. In the depicted embodiment, the thrust surfaces 15, 15.1 are flat. This is done because the thrust-exerting tooth flank of a chain wheel driving a conveyor chain, in which the horizontal chain link 2 is incorporated, is flat. In addition to having flat thrust surfaces 15, 15.1, they can also be curved, in particular they can have a convex curvature. The lower side 16 of the bend 5, like the lower side 11 of the bend 4, is also flat, since this surface is used as contact surface in a chain link pocket of a chain wheel. In the depicted embodiment, the lower sides 11, 16 of the bends 4, 5 are also situated in one plane. To that extent, the lower sides 11, 16 of the bends 4, 5, which are designed as contact surfaces, also represent functional surfaces.

The design of the thrust surface prolongations 12, 12.1 effectively prevents the formation of so-called duck tails, which form in the case of conventional horizontal chain links as a result of the engagement into the chain pockets of a chain wheel.

While, as already shown above, the vertical chain link 3.1 can hinge without impediment around the y axis with respect to the horizontal chain link 2, the hingeability of said vertical chain link around the z axis is impeded as a result of the excessive superelevation of the thrust surface prolongations 12, 12.1. This is not problematic for a conveyor chain, since a particular hingeability is not needed in this direction. In these directions, the vertical chain link 3.1 can pivot over several angular degrees with respect to the horizontal chain link 2.

In a variant that is not represented in the figures, it is provided that the bend pointed in the direction opposite from the conveyance direction is also excessively superelevated downward in the z direction.

The vertical chain link 3 hinging on the bend 4, on the other hand, can hinge freely around the z axis with respect to the horizontal chain link 2 in both directions. The hingeability around the y axis is impeded by the asymmetric design of the bend 4 pointed in the conveyance direction, but only in one direction, in particular in the direction pointing outward. A hingeability in this direction is not required, in any case not in every chain link articulation. A hingeability in the other direction around the y axis is possible without problem, so that the conveyor chain can be led around a chain wheel.

Figure 5:
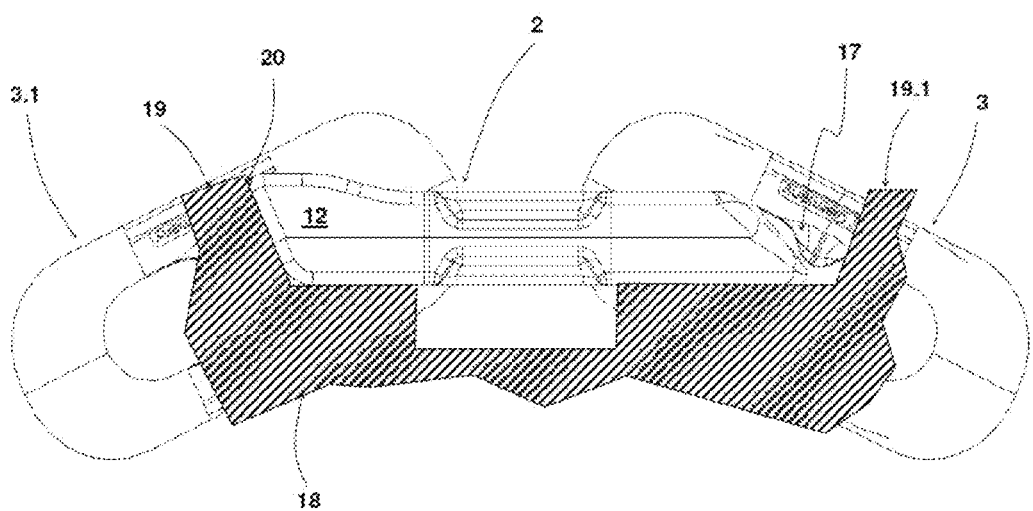
FIG. 5 is a side view the chain strand of FIG. 1 in a diagrammatic drive position in which the horizontal chain link engages in the pocket of a chain wheel.

FIG. 5 shows a side view of the chain strand 1, wherein the horizontal chain link 2 is inserted in a chain link recess 17 of a chain wheel 18 that is in other respects not represented further. The chain link recess 17 is delimited by two teeth 19, 19.1. The large-surface contact of the tooth surface 20 of the tooth 19 on the thrust surface 15 of the thrust surface prolongation 12 can be seen clearly. As a result of this large-surface contact, in particular due to a clearly reduced contact pressure, the surface wear is considerably reduced in comparison to conventional thrust arrangements. The greater height of the thrust surfaces 15, 15.1 in the z direction has the effect that a flipping of the conveyor chain is no longer required, so that the effort otherwise necessary for the removal and installation in order to flip over the conveyor chain is no longer required. A conveying operation therefore no longer needs to be interrupted for the purpose of flipping the conveyor chain inserted in a scraper conveyor.

The horizontal chain link 2 described in the figures is also asymmetric with respect to the y-z central plane, since the bend 4 pointing in the conveyance direction differs in terms of its shaping from the bend 5. The horizontal chain link 2 is designed symmetrically with respect to the x-z central plane. Nonetheless, with respect to this plane as well, asymmetries can be provided, for example, differences in the design of the scraper connection pockets. This is possible above all in view of the fact that the conveyor chains implemented with such horizontal chain links no longer have to be flipped.

The horizontal chain link 2 and, in the represented embodiment example, also the vertical chain links 3, 4 are forged parts.

The invention is described further in reference to the figures on the basis of an embodiment example. The embodiment example relates to a design of the chain link according to the claim as horizontal chain link as part of a conveyor chain for use in a scraper conveyor. The properties and advantages of the chain link according to the invention, which are described in connection with this embodiment example, can also be applied to numerous other embodiments.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Chain strand
2 Horizontal chain link
3, 3.1 Vertical chain link
4 Bend
5 Bend
6 Inner space
7, 7.1 Leg
8 Guide surface
9, 9.1 Partial surface
10 Edge
11 Lower side
12, 12.1 Thrust surface prolongation
13 Bend section
14 Upper side
15, 15.1 Thrust surface
16 Lower side
17 Chain link recess
18 Chain wheel
19, 19.1 Tooth
20 Tooth surface
$h_1$ Height
$h_2$ Height

I claim:

1. A conveyor chain of a scraper conveyor having a chain link for connecting two additional chain links hooked therein, the chain link comprising:
   two bends and two legs connecting the bends;
   the chain link having one or more functional surfaces on an external side of the chain link facing away from an interior space of the chain link; and
   wherein the chain link is asymmetric relative to at least an x-y central plane central of the chain link, wherein at least one of the bends form or enlarge one or more of the functional surfaces.

2. The chain link of claim 1, wherein asymmetry in at least one bend of the chain link is formed by an enlargement of a cross-sectional area in comparison to a cross-sectional area of a standard round steel chain link having a same nominal diameter.

3. The chain link of claim 2, wherein at least one bend is asymmetric with respect to an x-y central plane restricting freedom of movement of the chain link hinging thereon wherein the x-y central plane defines a first side and a second side of the chain link.

4. The chain link of claim 3, wherein the chain link is a horizontal chain link.

5. The chain link of claim 4, wherein the bend further comprises a guide surface extending over the x-y central plane, wherein the bend faces in a conveyance direction of a conveyor chain formed from at least one horizontal chain link, wherein the guide surface extends over a height ($h_1$) (z direction) of the horizontal chain link and is tilted toward one of the first or second side.

6. The chain link of claim 5, wherein the guide surface extends over at least 70% of the height ($h_1$) of the horizontal chain link.

7. The chain link of claim 5 wherein the height ($h_1$) of the horizontal chain link is quantitatively the same or approximately the same on the first side and the second side of the x-y central plane.

8. The chain link of claim 5, wherein the lower side of the bend is flat, said lower side forming an acute angle with the guide surface, thereby forming a lower contact surface of a bend in a chain link pocket of a chain wheel.

9. The chain link of claim 5, wherein the bend facing in a direction opposite from the conveyance direction of a conveyor chain formed from the horizontal chain links further comprises a thrust surface formed for the engagement of a tooth surface of a tooth of a chain wheel, adjoining a central bend section used for hinging with a vertical chain link, on both sides of said central bend section.

10. The chain link of claim 9, wherein the thrust surfaces are the surfaces which point in the direction opposite from the conveyance direction of a thrust surface projection by means of which surfaces the central bend section is enclosed in the y directions.

11. The chain link of claim 9 wherein a lower side of the bend is flat, said lower side forming an acute angle with the thrust surface.

12. The chain link of claim 10 wherein an upper termination of a thrust surface prolongations is increased in height in comparison to an upper termination of the central bend section enclosed by said thrust surface prolongations.

13. The chain link of claim 12, wherein a total height of the thrust surface prolongations is greater than an inner width of a vertical chain link hinging on the central bend section of this bend.

14. A steel link chain with individual chain links hooked into one another, consisting of an alternation of horizontal chain links and of vertical chain links wherein the horizontal chain links are the horizontal chain link of claim 5.

15. A steel link chain with individual chain links hooked into one another, consisting of an alternation of horizontal chain links and of vertical chain links wherein the horizontal chain links are the horizontal chain link of claim 6.

16. A steel link chain with individual chain links hooked into one another, consisting of an alternation of horizontal chain links and of vertical chain links wherein the horizontal chain links are the horizontal chain link of claim 7.

17. The chain link of claim 5, wherein the guide surface extends over at least 50% of the height ($h_1$) of the horizontal chain link.

* * * * *